(12) United States Patent
Zhao

(10) Patent No.: US 12,089,279 B2
(45) Date of Patent: Sep. 10, 2024

(54) RADIO RESOURCE CONTROL CONNECTION MANAGEMENT METHOD AND TERMINAL

(71) Applicant: DATANG MOBILE COMMUNICATIONS EQUIPMENT CO., LTD., Beijing (CN)

(72) Inventor: Yali Zhao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 579 days.

(21) Appl. No.: 17/413,704

(22) PCT Filed: Sep. 29, 2019

(86) PCT No.: PCT/CN2019/108875
§ 371 (c)(1),
(2) Date: Jun. 14, 2021

(87) PCT Pub. No.: WO2020/119224
PCT Pub. Date: Jun. 18, 2020

(65) Prior Publication Data
US 2022/0022277 A1    Jan. 20, 2022

(30) Foreign Application Priority Data
Dec. 14, 2018 (CN) .......................... 201811531268.2

(51) Int. Cl.
*H04W 76/27* (2018.01)
*H04L 1/1812* (2023.01)
*H04W 72/12* (2023.01)

(52) U.S. Cl.
CPC ........... *H04W 76/27* (2018.02); *H04L 1/1812* (2013.01); *H04W 72/12* (2013.01)

(58) Field of Classification Search
CPC ..... H04W 76/27; H04W 72/12; H04W 72/04; H04W 76/14; H04W 76/10; H04W 76/19;
(Continued)

(56) References Cited

U.S. PATENT DOCUMENTS 10,524,205 B2 * 12/2019 Jung ..................... H04W 88/04
10,555,259 B2 *  2/2020 Jung ..................... H04W 8/005
(Continued)

FOREIGN PATENT DOCUMENTS

| CN | 102223658 A | 10/2011 |
| CN | 102905334 A | 1/2013 |

(Continued)

OTHER PUBLICATIONS

Chinese Office Action dated Jun. 28, 2021 for CN Application No. 201811531268.2.
(Continued)

*Primary Examiner* — Brian T O Connor
(74) *Attorney, Agent, or Firm* — Harness, Dickey & Pierce, P.L.C.

(57) ABSTRACT

This application provides a radio resource control connection management method and a terminal, and relates to the technical field of communications. The radio resource control connection management method includes: transmitting, by a terminal in a target RRC state, an RRC connection management message to a network device in a case that a predetermined condition is met. The predetermined condition includes one of following information: first information about a link quality of a sidelink interface, second information about a transmission path selection of a sidelink service, third information about a resource allocation mode corresponding to the sidelink service, fourth information about a radio access technology RAT corresponding to the sidelink service.

20 Claims, 3 Drawing Sheets

(58) Field of Classification Search
CPC ... H04W 76/23; H04W 72/231; H04W 76/30; H04W 92/18; H04W 36/03; H04W 72/20; H04L 1/1812

See application file for complete search history.

(56) References Cited

U.S. PATENT DOCUMENTS

| | | | |
|---|---|---|---|
| 11,197,296 B2* | 12/2021 | Faurie | H04W 72/0453 |
| 11,438,736 B2* | 9/2022 | Fehrenbach | H04W 84/047 |
| 11,678,301 B2* | 6/2023 | Lee | H04W 8/24 370/329 |
| 2014/0179330 A1 | 6/2014 | Du et al. | |
| 2014/0243038 A1 | 8/2014 | Schmidt et al. | |
| 2015/0215981 A1 | 7/2015 | Patil et al. | |
| 2015/0327240 A1 | 11/2015 | Yamada et al. | |
| 2016/0094975 A1 | 3/2016 | Sheng | |
| 2017/0006585 A1 | 1/2017 | Jung et al. | |
| 2017/0303240 A1 | 10/2017 | Basu Mallick et al. | |
| 2017/0325229 A1 | 11/2017 | Gao et al. | |
| 2018/0115930 A1 | 4/2018 | Belleschi et al. | |
| 2018/0206286 A1 | 7/2018 | Pragada et al. | |
| 2018/0279275 A1* | 9/2018 | Chen | H04W 72/23 |
| 2019/0124711 A1 | 4/2019 | Dai | |
| 2020/0045579 A1 | 2/2020 | Xu et al. | |
| 2020/0092685 A1* | 3/2020 | Fehrenbach | H04W 76/14 |
| 2022/0022082 A1* | 1/2022 | Tseng | H04L 1/0026 |
| 2022/0408226 A1* | 12/2022 | Fehrenbach | H04B 7/15507 |

FOREIGN PATENT DOCUMENTS

| | | |
|---|---|---|
| CN | 104469827 A | 3/2015 |
| CN | 105009676 A | 10/2015 |
| CN | 105636217 A | 6/2016 |
| CN | 105934985 A | 9/2016 |
| CN | 106105355 A | 11/2016 |
| CN | 106233780 A | 12/2016 |
| CN | 106664700 A | 5/2017 |
| CN | 106961747 A | 7/2017 |
| CN | 107211470 A | 9/2017 |
| CN | 107318176 A | 11/2017 |
| CN | 107438258 A | 12/2017 |
| CN | 108605253 A | 9/2018 |
| CN | 108616991 A | 10/2018 |
| CN | 108631917 A | 10/2018 |
| CN | 108633074 A | 10/2018 |
| CN | 108924891 A | 11/2018 |
| CN | 108924892 A | 11/2018 |
| EP | 2663113 A1 | 11/2013 |
| EP | 2950586 A1 | 12/2015 |
| EP | 3223575 A1 | 9/2017 |
| WO | WO-2016/016715 A2 | 2/2016 |
| WO | WO-2017/123288 A1 | 7/2017 |
| WO | WO-2019/098781 A1 | 5/2019 |

OTHER PUBLICATIONS

Gallo, Laurent and Harri, Jerome, "Unsupervised Long-Term Evolution Device-to-Device, A Case Study for Safety-Critical V2X Communications", IEEE Vehicular Technology Magazine, Jun. 2017.

ZTE, "Discussion on D2D Direct Communication", Agenda item 7.5.2, 3GPP TSG-RAN WG2 Meeting #83, R2-132681, Barcelona, Spain, Aug. 19-23, 2013.

Written Opinion and International Search Report for PCT/CN2019/108875 dated Jan. 2, 2020.

Huawei, Hisilicon, "Discard the AS context and Resumeld when initiating the establishment of a RRC Connection", Change Request, 3GPP TSG-RAN2 Meeting #103, R2-1811823, Gothenburg, Sweden, Aug. 20-24, 2018.

Huawei, Hisilicon, "Corrections to EDT in 36.331", Change Request, 3GPP TSG-RAN2 Meeting #104, R2-1816372, Spokane, USA, Nov. 12-16, 2018.

CATT, "New Triggers for Uu RRC Connection Establishment/Resume", Agenda item 11.4.2, 3GPP TSG-RAN WG2 Meeting #106, R21905807, Reno, USA, May 13-17, 2019.

LG Electronics, "Study on NR V2X" 3GPP TSG RAN meeting #82, RP-182490, Sorrento, Italy, Dec. 10-13, 2018.

Extended European Search Report dated Dec. 10, 2021 for EP Application No. 19897206.9.

Interdigital Communications, "Remaining aspects of Mode Switching", Agenda Item 7.3.2.1.3, 3GPP TSG-RAN2 Meeting #87bis, R2-144553, Oct. 6-11, 2014, Shanghai, China.

* cited by examiner

Transmitting, by a terminal in a target RRC state, an RRC connection management message to a network device in a case that a predetermined condition is met — 21

RADIO RESOURCE CONTROL CONNECTION MANAGEMENT METHOD AND TERMINAL

CROSS-REFERENCE TO RELATED APPLICATIONS

The present application is the U.S. national phase of PCT Application No. PCT/CN2019/108875 filed on Sep. 29, 2019, which claims a priority to the Chinese patent application No. 201811531268.2 filed in China on Dec. 14, 2018, a disclosure of which is incorporated herein by reference in its entirety.

TECHNICAL FIELD

The present disclosure relates to the field of communication technology, in particular to a radio resource control connection management method and a terminal.

BACKGROUND

In long term evolution (LTE) direct communication systems, a trigger condition for an idle-state terminal to initiate a radio resource control (RRC) connection establishment is that a transmission resource pool available for the direct communication is not configured for the direct communication frequency interest to the terminal.

With the introduction of new radio (NR), whether there are new trigger conditions of RRC connection establishment/resume for idle-state and inactive-state terminals in a NR direct communication system needs to be considered.

SUMMARY

Some embodiments of the present disclosure provide a radio resource control connection management method and a terminal, to solve the problem of being unable to satisfy usage requirements of NR systems and unable to ensure the quality of service (QoS) requirements of services due to the fact that the NR systems cannot directly use the trigger condition for an idle-state terminal to initiate an RRC connection establishment in LTE sidelink systems, and no clear and definite scheme as to how to initiate an RRC connection process is specified for NR systems.

To solve the above technical problem, some embodiments of the present disclosure provide a radio resource control (RRC) connection management method. The method includes:

transmitting, by a terminal in a target RRC state, an RRC connection management message to a network device in a case that a predetermined condition is met, wherein the predetermined condition includes one of following information;

first information about a link quality of a sidelink interface;

second information about a transmission path selection of a sidelink service;

third information about a resource allocation mode corresponding to the sidelink service;

fourth information about a radio access technology (RAT) corresponding to the sidelink service.

Specifically, the terminal is a terminal having data available on a logic channel corresponding to the sidelink interface.

Specifically, the first information includes one of following information:

the terminal experiencing a radio link failure (RLF) on the sidelink interface;

the terminal experiencing a beam failure on the sidelink interface;

a quantity of hybrid automatic repeat request (HARQ) transmissions of a first process of the terminal on the sidelink interface being greater than or equal to a first threshold;

a quantity of automatic repeat request (ARQ) transmissions of the terminal on the sidelink interface being greater than or equal to a second threshold;

a measurement result of a transmission resource pool of the sidelink interface obtained by the terminal is smaller than a first limit value;

a waiting time of a data packet of the sidelink service of the terminal in a buffer being greater than or equal to a predetermined time threshold;

for unicast or multicast terminals, a synchronization between a transmitting terminal and a receiving terminal in a sidelink failing.

Further, the terminal experiencing the RLF on the sidelink interface includes one of following information:

a physical layer of the terminal indicating, to an RRC layer of the terminal, that a problem occurs in a physical layer link of the sidelink interface;

the quantity of ARQ transmissions of the terminal on the sidelink interface reaching a predetermined maximum transmission quantity.

Further, the waiting time includes one or a sum of at least two of following information:

a waiting time of the data packet of the sidelink service in a packet data convergence protocol (PDCP) layer buffer;

a waiting time of the data packet of the sidelink service in a radio link control (RLC) layer buffer;

a waiting time of the data packet of the sidelink service in a medium access control (MAC) layer buffer.

Specifically, the second information includes:

that a transmission path for the sidelink service needs to be switched from a sidelink to a Uu link in a cellular network.

Specifically, the third information includes one of following information:

that a resource allocation mode to be used by a first sidelink service of the terminal is switched from a terminal autonomous selecting resource allocation mode to a network scheduling resource allocation mode;

that a resource allocation mode currently used by the terminal is switched from the terminal autonomous selecting resource allocation mode to the network scheduling resource allocation mode.

Specifically, the fourth information includes one of following information:

that a current sidelink interface does not support the radio access technology selected by the terminal for the sidelink service;

that for unicast or multicast, radio access technologies supported by a transmitting terminal and a receiving terminal for the sidelink interface do not match each other.

Specifically, the RRC connection management message is an RRC connection establishment request message in a case that the target RRC state is an RRC_IDLE state;

the RRC connection management message is an RRC connection resume request message in a case that the target RRC state is an RRC_INACTIVE state.

Further, the RRC connection establishment request message carries a reason for an RRC connection establishment request in a case that the target RRC state is an RRC_IDLE state; or, the RRC connection resume request message carries a reason for an RRC connection resume request in a case that the target RRC state is an RRC_INACTIVE state.

Some embodiments of the present disclosure further provide a terminal, including a transceiver, a storage, a processor and a program that is stored in the storage and configured to be executed by the processor, wherein the processor is configured to execute the program to implement following step:

transmitting an RRC connection management message to a network device in a case that a predetermined condition is met, when the terminal is in a target RRC state, wherein the predetermined condition includes one of following information;

first information about a link quality of a sidelink interface;

second information about a transmission path selection of a sidelink service;

third information about a resource allocation mode corresponding to the sidelink service;

fourth information about a radio access technology (RAT) corresponding to the sidelink service.

Specifically, the terminal is a terminal having data available on a logic channel corresponding to the sidelink interface.

Specifically, the first information includes one of following information:

the terminal experiencing a radio link failure (RLF) on the sidelink interface;

the terminal experiencing a beam failure on the sidelink interface;

a quantity of hybrid automatic repeat request (HARQ) transmissions of a first process of the terminal on the sidelink interface being greater than or equal to a first threshold;

a quantity of automatic repeat request (ARQ) transmissions of the terminal on the sidelink interface being greater than or equal to a second threshold;

a measurement result of a transmission resource pool of the sidelink interface obtained by the terminal is smaller than a first limit value;

a waiting time of a data packet of the sidelink service of the terminal in a buffer being greater than or equal to a predetermined time threshold;

for unicast or multicast terminals, a synchronization between a transmitting terminal and a receiving terminal in a sidelink failing.

Further, that the terminal experiencing the RLF on the sidelink interface includes one of following information:

a physical layer of the terminal indicating, to an RRC layer of the terminal, that a problem occurs in a physical layer link of the sidelink interface;

the quantity of ARQ transmissions of the terminal on the sidelink interface reaching a predetermined maximum transmission quantity.

quantity of ARQ transmissions Further, the waiting time includes one or a sum of at least two of following information;

a waiting time of the data packet of the sidelink service in a packet data convergence protocol (PDCP) layer buffer;

a waiting time of the data packet of the sidelink service in a radio link control (RLC) layer buffer;

a waiting time of the data packet of the sidelink service in a medium access control (MAC) layer buffer.

Specifically, the second information includes:

that a transmission path for the sidelink service needs to be switched from a sidelink to a Uu link in a cellular network.

Specifically, the third information includes one of following information:

that a resource allocation mode to be used by a first sidelink service of the terminal is switched from a terminal autonomous selecting resource allocation mode to a network scheduling resource allocation mode;

that a resource allocation mode currently used by the terminal is switched from the terminal autonomous selecting resource allocation mode to the network scheduling resource allocation mode.

Specifically, the fourth information includes one of following information:

that a current sidelink interface does not support the radio access technology selected by the terminal for the sidelink service;

that for unicast or multicast, radio access technologies supported by a transmitting terminal and a receiving terminal for the sidelink interface do not match each other.

Specifically, the RRC connection management message is an RRC connection establishment request message in a case that the target RRC state is an RRC_IDLE state;

the RRC connection management message is an RRC connection resume request message in a case that the target RRC state is an RRC_INACTIVE state.

Further, the RRC connection establishment request message carries a reason for an RRC connection establishment request in a case that the target RRC state is an RRC_IDLE state; or, the RRC connection resume request message carries a reason for an RRC connection resume request in a case that the target RRC state is an RRC_INACTIVE state.

Some embodiments of the present disclosure further provide a computer readable storage medium, storing therein a computer program, wherein the computer program is configured to be executed by a processor to implement the foregoing RRC connection management method.

Some embodiments of the present disclosure further provide a terminal, including:

a transmission module, configured to transmit an RRC connection management message to a network device in a case that a predetermined condition is met, when the terminal is in a target RRC state, wherein the predetermined condition includes one of following information;

first information about a link quality of a sidelink interface;

second information about a transmission path selection of a sidelink service;

third information about a resource allocation mode corresponding to the sidelink service;

fourth information about a radio access technology (RAT) corresponding to the sidelink service.

The present disclosure has following beneficial effects: in the foregoing solution, an RRC connection management message is transmitted to a network device in a case that a predetermined condition is met, such that the network device may determine a suitable resource allocation manner for the terminal, thus ensuring that the QoS requirements of services are met.

DETAILED DESCRIPTION

To describe the objective, the technical solutions and the advantages of the present disclosure more clearly, the present disclosure are described in detail hereinafter with reference to the accompanying drawings and specific embodiments.

First, some concepts mentioned in some embodiments of the present disclosure are described hereinafter.

Figures 1, 2:
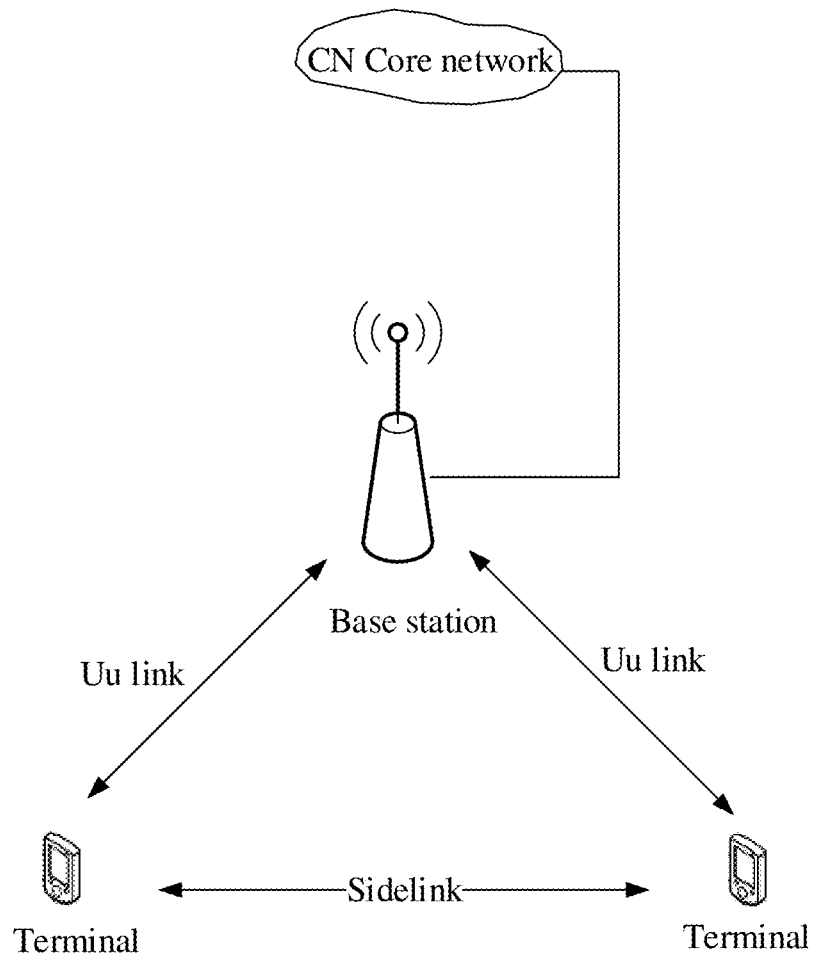
FIG. 1 is a schematic diagram of links by which a terminal communicates with a base station and a terminal communicates with another terminal.
FIG. 2 is a flow diagram of an RRC connection management method according to some embodiments of the present disclosure.

Devices close to each other may conduct direct communication therebetween. For ease of description, the direct communication link between devices is referred to as sidelink, and the radio interface corresponding to the sidelink is referred to as direct communication interface (also known as sidelink interface); a cellular communication link between a network and a sidelink device is referred to as Uu link, and a corresponding interface is referred to as Uu interface; as shown in FIG. 1.

The devices conducting direct communication may be in network coverage, or out of network coverage, or some of the devices are in network coverage and some other devices are out of network coverage. The in network coverage refers to that the device conducting direct communication is within the coverage range of the 3$^{rd}$Generation Partnership Project (3GPP) sidelink carrier; the out of network coverage refers to that the device conducting direct communication is not within the coverage range of the 3GPP sidelink carrier.

There are three typical sidelink scenarios as follows:

A11, one-to-one communication between sidelink terminals (unicast);

A12, a device may transmit the same data to all devices of one communication group at a time (multicast);

A13, a device may transmit the same data to all nearby devices at a time (broadcast).

The sidelink supports two resource allocation modes:

A21, network scheduling resource allocation mode, namely, a mode in which the network allocates resources for the terminal according to the sidelink buffer state reporting (BSR) of the terminal;

A22, terminal autonomous selecting resource allocation mode, namely, a mode in which the terminal autonomously selects a resource from preconfigured or network-broadcast transmission resources for sidelink transmission.

With respect to the sidelink interface, if the terminal is in network coverage, then regardless of whether the network scheduling resource allocation mode or the terminal autonomous selecting resource allocation mode is used, resources used by the sidelink interface of the terminal are always under the control of the network, that is, the network controls the resource pool allocated to the sidelink interface through the Uu interface (the terminal autonomous selecting resource allocation mode) or controls the specific resources allocated to the sidelink interface through the Uu interface (network scheduling resource allocation mode). Thus, they are collectively referred to as Uu-based resource allocation.

A vehicle-to-everything (V2X) service data transmission path: the V2X service may be transmitted via the sidelink interface or the Uu interface, and the selection of the service transmission path is up to an upper layer (e.g., a service layer).

In view of the problem of being unable to satisfy usage requirements of NR systems and unable to ensure the reliability of NR systems due to the fact that the NR systems cannot directly use the trigger condition for an idle-state terminal to initiate an RRC connection establishment in LTE sidelink systems and no clear and definite scheme as to how to initiate an RRC connection process is specified for NR systems, the present disclosure provides a radio resource control connection management method and a terminal.

As shown in FIG. 2, an RRC connection management method according to an embodiment of the present disclosure is applied to a terminal and includes:

a step 21, transmitting, by the terminal in a target RRC state, an RRC connection management message to a network device in a case that a predetermined condition is met.

It is noted, the target RRC state may be an RRC idle (RRC_IDLE) state or an RRC inactive (RRC_INACTIVE) state; the RRC connection management message transmitted by the terminal is an RRC connection establishment request message when the terminal is in an RRC_IDLE state; the RRC connection management message transmitted by the terminal is an RRC connection resume request message when the terminal is in an RRC_INACTIVE state.

It is further noted, the terminal is a terminal having data available on a logic channel corresponding to the sidelink interface.

The foregoing manner refers to that, regardless of whether a transmission resource pool at the sidelink frequency is configured by a network device for the terminal by broadcasting, a terminal in a target RRC state always transmits an RRC connection management message to the network device when there is a sidelink service to be transmitted as long as a predetermined condition is met by the terminal.

It is noted, the predetermined condition includes one of following information: B1, B2, B3, B4.

B1, first information about a link quality of a sidelink interface.

Specifically, the first information includes one of following information: B11, B12, B13, B14, B15, B16, B17.

B11, the terminal experiences a radio link failure (RLF) on the sidelink interface.

Specifically, B11 includes one of following information:

B111, a physical layer of the terminal indicates to an RRC layer of the terminal that a problem occurs in a physical layer link of the sidelink interface;

B112, a quantity of automatic repeat request (ARQ) transmissions of the terminal on the sidelink interface reaches a predetermined maximum transmission quantity.

B12, the terminal experiences a beam failure on the sidelink interface.

B13, a quantity of hybrid automatic repeat request (HARQ) transmissions of a first process of the terminal on the sidelink interface is greater than or equal to a first threshold.

It is noted, the first process refers to any one process of the terminal. In other words, the quantity of HARQ transmissions of any one process of the terminal on the sidelink interface being greater than or equal to the first threshold would trigger the terminal to transmit the RRC connection management message to the network device. It is further noted, the first threshold is an integer greater than or equal to 1, and the first threshold may be preconfigured, or configured by the network device for the terminal by broadcasting.

B14, a quantity of ARQ transmissions of the terminal on the sidelink interface is greater than or equal to a second threshold.

It is noted, the second threshold is an integer greater than or equal to 1, and the second threshold may be preconfigured, or configured by the network device for the terminal by broadcasting.

B15, a measurement result of a transmission resource pool of the sidelink interface obtained by the terminal is smaller than a first limit value.

Specifically, the first limit value may be preconfigured, or configured by the network device for the terminal by broadcasting.

B16, a waiting time of a data packet of the sidelink service of the terminal in a buffer is greater than or equal to a predetermined time threshold.

It is noted, the waiting time includes one or a sum of at least two of following information:

B161, a waiting time of the data packet of the sidelink service in a packet data convergence protocol (PDCP) layer buffer;

B162, a waiting time of the data packet of the sidelink service in a radio link control (RLC) layer buffer;

B163, a waiting time of the data packet of the sidelink service in a medium access control (MAC) layer buffer.

It is further noted, the predetermined time threshold may be preconfigured, or configured by the network device for the terminal by broadcasting.

B17, for unicast or multicast terminals, a synchronization between a transmitting terminal and a receiving terminal in a sidelink fails.

B2, second information about a transmission path selection of a sidelink service.

Here, it is noted, the second information refers to that a transmission path for the sidelink service needs to be switched from a sidelink to a Uu link in a cellular network. Specifically, the sidelink service includes, but is not limited to: the V2X service, and a device to device (D2D) service.

B3, third information about a resource allocation mode corresponding to the sidelink service.

It is noted, the third information includes one of following information: B31, B32.

B31, a resource allocation mode requiring to be used by a first sidelink service of the terminal is switched from a terminal autonomous selecting resource allocation mode to a network scheduling resource allocation mode.

It is noted, the first sidelink service refers to any one sidelink service of the terminal. In other words, a resource allocation mode to be used by any one sidelink service of the terminal being switched from a terminal autonomous selecting resource allocation mode to a network scheduling resource allocation mode would trigger the terminal to transmit the RRC connection management message to the network device.

B32, a resource allocation mode currently used by the terminal is switched from the terminal autonomous selecting resource allocation mode to the network scheduling resource allocation mode.

B4, fourth information about a radio access technology (RAT) corresponding to the sidelink service.

It is noted, the fourth information includes one of following information:

B41, a current sidelink interface does not support the RAT selected by the terminal for the sidelink service;

B42, for unicast or multicast, RATs supported by a transmitting terminal and a receiving terminal for the sidelink interface do not match each other.

As long as any one of the above conditions is met by the terminal, the terminal is triggered to transmit an RRC connection management message to the network device. Further, the RRC connection establishment request message carries a reason for an RRC connection establishment request in a case that the target RRC state is an RRC_IDLE state; the RRC connection resume request message carries a reason for an RRC connection resume request in a case that the target RRC state is an RRC_INACTIVE state.

The practical applications of some embodiments of the present disclosure are described in details below.

Case 1

Figure 3:
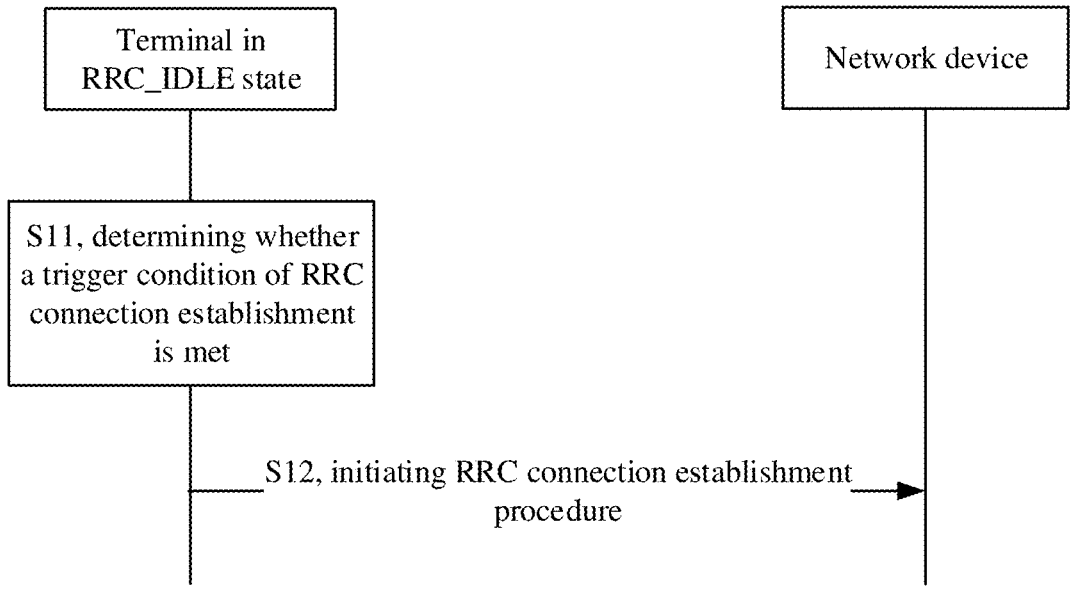
FIG. 3 is a schematic diagram of an RRC connection establishment process of a terminal in an RRC_IDLE state.

As shown in FIG. 3, a specific implementation process of some embodiments of the present disclosure applied to a terminal in an RRC_IDLE state includes a step S11 and a step S12.

Step S11, the terminal in the RRC_IDLE state determines whether a trigger condition of RRC connection establishment is met.

If the terminal in the RRC_IDLE state has a sidelink service to transmit, the terminal determines whether an RRC connection establishment needs to be triggered according to the following conditions: C1, C2, C3, C4, C5, C6, C7.

C1, the terminal experiences an RLF on the sidelink interface.

Specifically, the condition for determining whether the RLF occurs on the sidelink interface may be, but is not limited to, one of following conditions:

C11, a physical layer of the terminal indicates to an RRC layer of the terminal that a problem occurs in a physical layer link of the sidelink interface;

C12, a quantity of ARQ transmissions of the terminal on the sidelink interface reaches a predetermined maximum transmission quantity.

C2, the terminal experiences a beam failure on the sidelink interface.

If a beam forming fails on the sidelink interface, the RRC connection establishment may be triggered directly; alternatively, a beam recovery may be performed initially, and if the recovery fails, then the RRC connection establishment is triggered.

C3, a quantity of HARQ transmissions of a certain process of the terminal on the sidelink interface reaches N (N is an integer greater than or equal to 1).

It is noted, the value of N may be preconfigured, or configured by the network device for the terminal by broadcasting.

C4, a quantity of ARQ transmissions of the terminal on the sidelink interface reaches M (M is an integer greater than or equal to 1).

It is noted, the value of M may be preconfigured, or configured by the network device for the terminal by broadcasting.

C5, a measurement result of a transmission resource pool of the sidelink interface obtained by the terminal is less than a limit value.

It is noted, the limit value for the measurement result may be preconfigured, or configured by the network device for the terminal by broadcasting.

C6, a waiting time of a data packet of the sidelink service of the terminal in a buffer is greater than or equal to T.

The waiting time of the data packet in the buffer may be a waiting time in a PDCP layer buffer, a waiting time in an RLC layer buffer or a waiting time in an MAC layer buffer; or the waiting time of the data packet in the buffer may be a sum of waiting times in the buffers corresponding to any two or three protocol layers.

It is noted, the value of T may be preconfigured, or configured by the network device for the terminal by broadcasting.

C7, for unicast or multicast terminals, a synchronization between a transmitting terminal and a receiving terminal in a sidelink fails.

As long as any one of above conditions is met, it is determined that the trigger condition of RRC connection establishment is met, and the terminal in the RRC_IDLE state is triggered to initiate the RRC connection establishment procedure.

Step S12, the terminal initiates the RRC connection establishment procedure.

For a terminal in the RRC_IDLE state, once any one condition in the step S11 is met, the terminal initiates an RRC connection establishment request to the network device through a Uu interface. The RRC connection establishment request message may carry a reason for the RRC connection establishment.

Case 2

Figure 4:
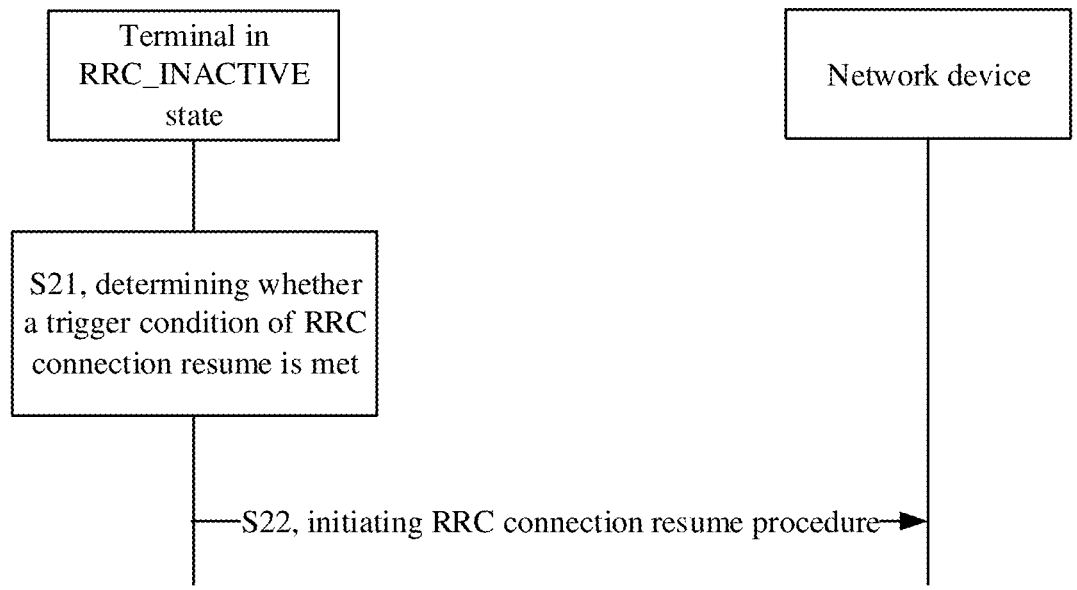
FIG. 4 is a schematic diagram of an RRC connection resume process of a terminal in an RRC_INACTIVE state.

As shown in FIG. 4, a specific implementation process of some embodiments of the present disclosure applied to a terminal in an RRC_INACTIVE state includes a step S21 and a step S22.

Step S21, the terminal in the RRC_INACTIVE state determines whether a trigger condition of RRC connection resume is met.

If the terminal in the RRC_INACTIVE state has a sidelink service to transmit, the terminal determines whether an RRC connection resume procedure needs to be triggered according to the following conditions: D1, D2, D3, D4, D5, D6, D7.

D1, the terminal experiences an RLF on the sidelink interface.

Specifically, the condition for determining whether the RLF occurs on the sidelink interface may be, but is not limited to, one of following conditions:

D11, a physical layer of the terminal indicates to an RRC layer of the terminal that a problem occurs in a physical layer link of the sidelink interface;

D12, a quantity of ARQ transmissions of the terminal on the sidelink interface reaches a predetermined maximum transmission quantity.

D2, the terminal experiences a beam failure on the sidelink interface.

If a beam forming fails on the sidelink interface, the RRC connection resume may be triggered directly; alternatively, a beam recovery may be performed initially, and if the beam recovery fails, then the RRC connection resume is triggered.

D3, a quantity of HARQ transmissions of certain process of the terminal on the sidelink interface reaches N (N is an integer greater than or equal to 1).

It is noted, the value of N may be preconfigured, or configured by the network device for the terminal by broadcasting.

D4, a quantity of ARQ transmissions of the terminal on the sidelink interface reaches M (M is an integer greater than or equal to 1).

It is noted, the value of M may be preconfigured, or configured by the network device for the terminal by broadcasting.

D5, a measurement result of a transmission resource pool of the sidelink interface obtained by the terminal is less than a limit value.

It is noted, the limit value for the measurement result may be preconfigured, or configured by the network device for the terminal by broadcasting.

D6, a waiting time of a data packet of the sidelink service of the terminal in a buffer is greater than or equal to T.

The waiting time of the data packet in the buffer may be a waiting time in a PDCP layer buffer, a waiting time in an RLC layer buffer or a waiting time in an MAC layer buffer; or the waiting time of the data packet in the buffer may be a sum of waiting times in the buffers corresponding to any two or three protocol layers.

It is noted, the value of T may be preconfigured, or configured by the network device for the terminal by broadcasting.

D7, for unicast or multicast terminals, a synchronization between a transmitting terminal and a receiving terminal in a sidelink fails.

As long as any one of above conditions is met, it is determined that the trigger condition of RRC connection resume is met, and the terminal in the RRC_INACTIVE state is triggered to initiate the RRC connection resume procedure.

Step S22, the terminal initiates the RRC connection resume procedure.

For a terminal in the RRC_INACTIVE state, once any one condition in the step S21 is met, the terminal initiates an RRC connection resume request to the network device through a Uu interface. The RRC connection resume request message may carry a reason for the RRC connection resume.

Case 3

Step S31, the terminal in the RRC_IDLE state determines whether a trigger condition of RRC connection establishment is met.

If the terminal in the RRC_IDLE state has a sidelink service to transmit, the terminal determines whether an RRC connection establishment needs to be triggered according to the following condition: an upper layer of the terminal determines that a transmission path for the current V2X service or the current D2D service needs to be switched from a sidelink (SL) to a Uu link.

As long as the above condition is met, it is determined that the trigger condition of RRC connection establishment is met, and the terminal in the RRC_IDLE state is triggered to initiate the RRC connection establishment procedure.

Step S32, the terminal initiates the RRC connection establishment procedure.

For a terminal in the RRC_IDLE state, once the condition in the step S31 is met, the terminal initiates an RRC connection establishment request to the network device through a Uu interface. The RRC connection establishment request message may carry a reason for the RRC connection establishment.

Case 4

Step S41, the terminal in the RRC_INACTIVE state determines whether a trigger condition of RRC connection resume is met.

If the terminal in the RRC_INACTIVE state has a sidelink service to transmit, the terminal determines whether an RRC connection resume procedure needs to be triggered according to the following condition: an upper layer of the terminal determines that a transmission path for the current V2X service or the current D2D service needs to be switched from an SL to a Uu link.

As long as the above condition is met, it is determined that the trigger condition of RRC connection resume is met, and the terminal in the RRC_INACTIVE state is triggered to initiate the RRC connection resume procedure.

Step S42, the terminal initiates the RRC connection resume procedure.

For a terminal in the RRC_INACTIVE state, once the condition in the step S41 is met, the terminal initiates an RRC connection resume request to the network device through a Uu interface. The RRC connection resume request message may carry a reason for the RRC connection resume.

Case 5

Step S51, the terminal in the RRC_IDLE state determines whether a trigger condition of RRC connection establishment is met.

If the terminal in the RRC_IDLE state has a sidelink service to transmit, the terminal determines whether an RRC connection establishment needs to be triggered according to one of the following conditions:

E1, a resource allocation mode to be used by certain sidelink service of the terminal is switched from a terminal autonomous selecting resource allocation mode to a network scheduling resource allocation mode;

E2, a resource allocation mode currently used by the terminal is switched from the terminal autonomous selecting resource allocation mode to the network scheduling resource allocation mode.

As long as any one of the above conditions is met, it is determined that the trigger condition of RRC connection establishment is met, and the terminal in the RRC_IDLE state is triggered to initiate the RRC connection establishment procedure.

Step S52, the terminal initiates the RRC connection establishment procedure.

For a terminal in the RRC_IDLE state, once any one of the conditions in the step S51 is met, the terminal initiates an RRC connection establishment request to the network device through a Uu interface. The RRC connection establishment request message may carry a reason for the RRC connection establishment.

Case 6

Step S61, the terminal in the RRC_INACTIVE state determines whether a trigger condition of RRC connection resume is met.

If the terminal in the RRC_INACTIVE state has a sidelink service to transmit, the terminal determines whether an RRC connection resume procedure needs to be triggered according to one of the following conditions:

F1, a resource allocation mode to be used by certain sidelink service of the terminal is switched from a terminal autonomous selecting resource allocation mode to a network scheduling resource allocation mode;

F2, a resource allocation mode currently used by the terminal is switched from the terminal autonomous selecting resource allocation mode to the network scheduling resource allocation mode.

As long as any one of the above conditions is met, it is determined that the trigger condition of RRC connection resume is met, and the terminal in the RRC_INACTIVE state is triggered to initiate the RRC connection resume procedure.

Step S62, the terminal initiates the RRC connection resume procedure.

For a terminal in the RRC_INACTIVE state, once any one of the conditions in the step S61 is met, the terminal initiates an RRC connection resume request to the network device through a Uu interface. The RRC connection resume request message may carry a reason for the RRC connection resume.

Case 7

Step S71, the terminal in the RRC_IDLE state determines whether a trigger condition of RRC connection establishment is met.

If the terminal in the RRC_IDLE state has a sidelink service to transmit, the terminal determines whether an RRC connection establishment needs to be triggered according to one of the following conditions:

G1, a current sidelink interface does not support the RAT selected by the terminal for the sidelink service;

G2, for unicast or multicast, RATs supported by a transmitting terminal and a receiving terminal for the sidelink interface do not match each other.

As long as any one of the above conditions is met, it is determined that the trigger condition of RRC connection establishment is met, and the terminal in the RRC_IDLE state is triggered to initiate the RRC connection establishment procedure.

Step S72, the terminal initiates the RRC connection establishment procedure.

For a terminal in the RRC_IDLE state, once any one of the conditions in the step S71 is met, the terminal initiates an RRC connection establishment request to the network device through a Uu interface. The RRC connection establishment request message may carry a reason for the RRC connection establishment.

Case 8

Step S81, the terminal in the RRC_INACTIVE state determines whether a trigger condition of RRC connection resume is met.

If the terminal in the RRC_INACTIVE state has a sidelink service to transmit, the terminal determines whether an RRC connection resume procedure needs to be triggered according to one of the following conditions:

H1, a resource allocation mode to be used by certain sidelink service of the terminal is switched from a terminal autonomous selecting resource allocation mode to a network scheduling resource allocation mode;

H2, a resource allocation mode currently used by the terminal is switched from the terminal autonomous selecting resource allocation mode to the network scheduling resource allocation mode.

As long as any one of the above conditions is met, it is determined that the trigger condition of RRC connection resume is met, and the terminal in the RRC_INACTIVE state is triggered to initiate the RRC connection resume procedure.

Step S82, the terminal initiates the RRC connection resume procedure.

For a terminal in the RRC_INACTIVE state, once any one of the conditions in the step S81 is met, the terminal initiates an RRC connection resume request to the network device through a Uu interface. The RRC connection resume request message may carry a reason for the RRC connection resume.

It is noted, some embodiments of the present disclosure may satisfy usage requirements of NR systems and ensure the reliability of NR systems, and may further ensure a minimum impact to transmission of V2X service when a problem occurs in the sidelink interface.

Figure 5:
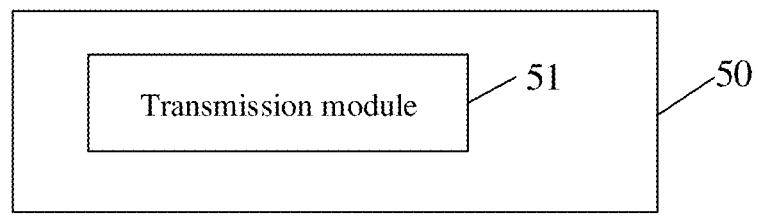
FIG. 5 is a schematic module diagram of a terminal according to some embodiments of the present disclosure.

As shown in FIG. 5, some embodiments of the present disclosure provide a terminal 50. The terminal includes:

a transmission module 51, configured to transmit an RRC connection management message to a network device in a case that a predetermined condition is met, when the terminal is in a target RRC state, wherein the predetermined condition includes one of following information;

first information about a link quality of a sidelink interface;

second information about a transmission path selection of a sidelink service;

third information about a resource allocation mode corresponding to the sidelink service;

fourth information about a radio access technology (RAT) corresponding to the sidelink service.

Specifically, the terminal is a terminal having data available on a logic channel corresponding to the sidelink interface.

Specifically, the first information includes one of following information:

the terminal experiencing a radio link failure (RLF) on the sidelink interface;

the terminal experiencing a beam failure on the sidelink interface;

a quantity of hybrid automatic repeat request (HARD) transmissions of a first process of the terminal on the sidelink interface being greater than or equal to a first threshold;

a quantity of automatic repeat request (ARQ) transmissions of the terminal on the sidelink interface being greater than or equal to a second threshold;

a measurement result of a transmission resource pool of the sidelink interface obtained by the terminal is smaller than a first limit value;

a waiting time of a data packet of the sidelink service of the terminal in a buffer being greater than or equal to a predetermined time threshold;

for unicast or multicast terminals, a synchronization between a transmitting terminal and a receiving terminal in a sidelink failing.

Further, the terminal experiencing the RLF on the sidelink interface includes one of following information:

a physical layer of the terminal indicates to an RRC layer of the terminal that a problem occurs in a physical layer link of the sidelink interface;

the quantity of ARQ transmissions of the terminal on the sidelink interface reaches a predetermined maximum transmission quantity.

Further, the waiting time includes one or a sum of at least two of following information:

a waiting time of the data packet of the sidelink service in a packet data convergence protocol (PDCP) layer buffer;

a waiting time of the data packet of the sidelink service in a radio link control (RLC) layer buffer;

a waiting time of the data packet of the sidelink service in a medium access control (MAC) layer buffer.

Specifically, the second information includes:

a transmission path for the sidelink service needs to be switched from a sidelink to a Uu link in a cellular network.

Specifically, the third information includes one of following information:

a resource allocation mode to be used by a first sidelink service of the terminal is switched from a terminal autonomous selecting resource allocation mode to a network scheduling resource allocation mode;

a resource allocation mode currently used by the terminal is switched from the terminal autonomous selecting resource allocation mode to the network scheduling resource allocation mode.

Specifically, the fourth information includes one of following information:

a current sidelink interface does not support the radio access technology selected by the terminal for the sidelink service;

for unicast or multicast, radio access technologies supported by a transmitting terminal and a receiving terminal for the sidelink interface do not match each other.

Specifically, the RRC connection management message is an RRC connection establishment request message in a case that the target RRC state is an RRC_IDLE state;

the RRC connection management message is an RRC connection resume request message in a case that the target RRC state is an RRC_INACTIVE state.

Further, the RRC connection establishment request message carries a reason for an RRC connection establishment request in a case that the target RRC state is an RRC_IDLE state; or, the RRC connection resume request message carries a reason for an RRC connection resume request in a case that the target RRC state is an RRC_INACTIVE state.

It is noted, the terminal embodiments respectively correspond to the foregoing method embodiments applied to the terminal, and all implementations of the foregoing method embodiments are applicable to the terminal embodiments and may achieve the same technical effects.

Figure 6:
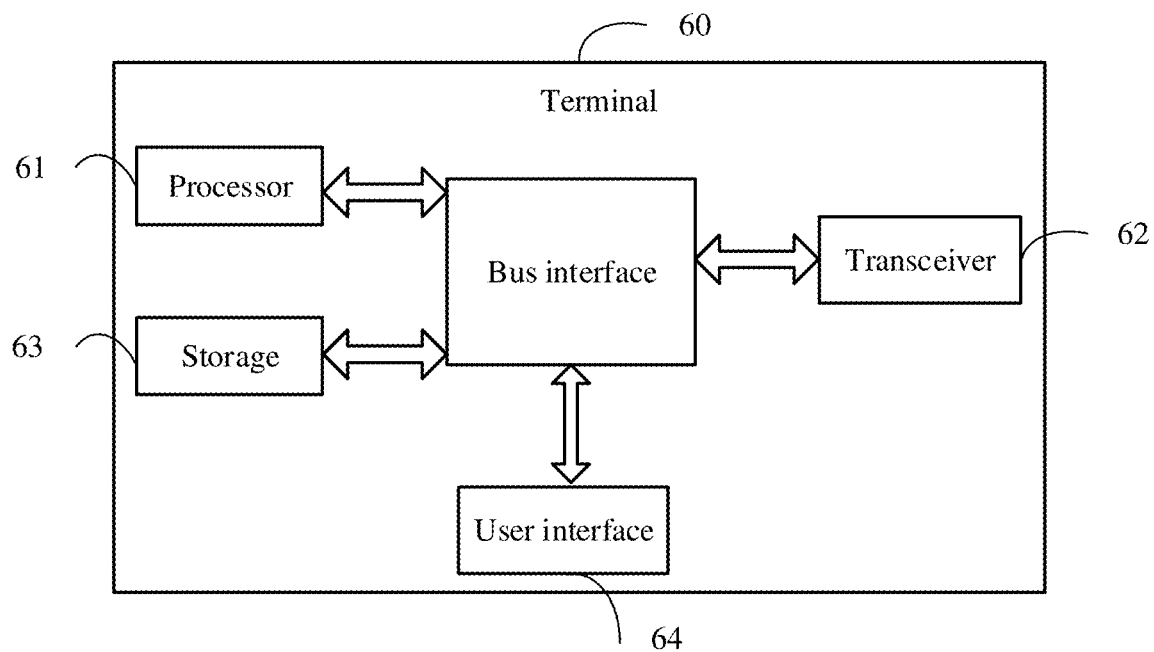
FIG. 6 is a structure diagram of a terminal according to some embodiments of the present disclosure.

As shown in FIG. 6, some embodiments of the present disclosure provide a terminal 60, including a processor 61, a transceiver 62, a storage 63, and a program stored in the storage 63 and configured to be executed by the processor 61, wherein the transceiver 62 is connected to the processor 61 and the storage 63 through a bus interface, the processor 61 is configured to read the program in the storage to implement following process:

transmitting, via the transceiver 62, an RRC connection management message to a network device in a case that a predetermined condition is met, when the terminal is in a target RRC state, wherein the predetermined condition includes one of following information;

first information about a link quality of a sidelink interface;

second information about a transmission path selection of a sidelink service;

third information about a resource allocation mode corresponding to the sidelink service;

fourth information about a radio access technology (RAT) corresponding to the sidelink service.

It is noted, in FIG. 6, a bus architecture may include any number of interconnected buses and bridges, and connect various circuits including one or more processors represented by the processor 61 and storage represented by the storage 63. The bus architecture may also connect various other circuits such as peripherals, voltage regulators and power management circuits, which is well known in the art. Therefore, a detailed description thereof is omitted herein. A bus interface provides an interface. The transceiver 62 may be multiple elements, that is, includes a transmitter and a receiver, to provide a unit for communication with various other apparatuses on a transmission medium. For different terminals, a user interface 64 may be an interface capable of connecting externally or internally a required device. The connected device includes, but is not limited to: a keypad, a display, a speaker, a microphone, a joystick, etc. The processor 61 is responsible for supervising the bus architecture and normal operation and the storage 63 can store the data currently used by the processor 61 during operation.

Specifically, the terminal is a terminal having data available on a logic channel corresponding to the sidelink interface.

Specifically, the first information includes one of following information:
the terminal experiences a radio link failure (RLF) on the sidelink interface;
the terminal experiences a beam failure on the sidelink interface;
a quantity of hybrid automatic repeat request (HARM) transmission of a first process of the terminal on the sidelink interface is greater than or equal to a first threshold;
a quantity of automatic repeat request (ARQ) transmission of the terminal on the sidelink interface is greater than or equal to a second threshold;
a measurement result of a transmission resource pool of the sidelink interface obtained by the terminal is less than a first limit value;
a waiting time of a data packet of the sidelink service of the terminal in a buffer is greater than or equal to a predetermined time threshold;
for unicast or multicast terminals, a synchronization between a transmitting terminal and a receiving terminal in a sidelink fails.

Further, that the terminal experiences the RLF on the sidelink interface includes one of following information:
a physical layer of the terminal indicates to an RRC layer of the terminal that a problem occurs in a physical layer link of the sidelink interface;
the quantity of ARQ transmissions of the terminal on the sidelink interface reaches a predetermined maximum transmission quantity.

Further, the waiting time includes one or a sum of at least two of following information:
a waiting time of the data packet of the sidelink service in a packet data convergence protocol (PDCP) layer buffer;
a waiting time of the data packet of the sidelink service in a radio link control (RLC) layer buffer;
a waiting time of the data packet of the sidelink service in a medium access control (MAC) layer buffer.

Specifically, the second information includes:
a transmission path for the sidelink service needs to be switched from a sidelink to a Uu link in a cellular network.

Specifically, the third information includes one of following information:
a resource allocation mode to be used by a first sidelink service of the terminal is switched from a terminal autonomous selecting resource allocation mode to a network scheduling resource allocation mode;
a resource allocation mode currently used by the terminal is switched from the terminal autonomous selecting resource allocation mode to the network scheduling resource allocation mode.

Specifically, the fourth information includes one of following information:
a current sidelink interface does not support the radio access technology selected by the terminal for the sidelink service;
for unicast or multicast, radio access technologies supported by a transmitting terminal and a receiving terminal for the sidelink interface do not match each other.

Specifically, the RRC connection management message is an RRC connection establishment request message in a case that the target RRC state is an RRC_IDLE state;
the RRC connection management message is an RRC connection resume request message in a case that the target RRC state is an RRC_INACTIVE state.

Optionally, the RRC connection establishment request message carries a reason for an RRC connection establishment request in a case that the target RRC state is an RRC_IDLE state; or,
the RRC connection resume request message carries a reason for an RRC connection resume request in a case that the target RRC state is an RRC_INACTIVE state.

The terminal according to some embodiments of the present disclosure transmits an RRC connection management message to a network device in a case that a predetermined condition is met, such that the network device may determine a suitable resource allocation manner for the terminal, thus ensuring that the QoS requirements of services are met.

Some embodiments of the present disclosure further provide a computer readable storage medium storing therein a computer program, wherein the computer program is configured to be executed by a processor, to implement the steps of the RRC connection management method applied to the terminal.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:
1. A radio resource control (RRC) connection management method, comprising:
transmitting, by a terminal in a target RRC state, an RRC connection management message to a network device in a case that a predetermined condition is met,
wherein the predetermined condition comprises one of following information;
first information about a link quality of a sidelink interface;
second information about a transmission path selection of a sidelink service;
third information about a resource allocation mode corresponding to the sidelink service;
fourth information about a radio access technology (RAT) corresponding to the sidelink service;
wherein the target RRC state is an RRC_IDLE state or an RRC_INACTIVE state.

2. The RRC connection management method according to claim 1, wherein the terminal is a terminal having data available on a logic channel corresponding to the sidelink interface.

3. The RRC connection management method according to claim 1, wherein the first information comprises one of following information:
the terminal experiencing a radio link failure (RLF) on the sidelink interface;

the terminal experiencing a beam failure on the sidelink interface;
a quantity of hybrid automatic repeat request (HARQ) transmissions of a first process of the terminal on the sidelink interface being greater than or equal to a first threshold;
a quantity of automatic repeat request (ARQ) transmissions of the terminal on the sidelink interface being greater than or equal to a second threshold;
a measurement result of a transmission resource pool of the sidelink interface for the terminal being smaller than a first limit value;
a waiting time of a data packet of the sidelink service of the terminal in a buffer being greater than or equal to a predetermined time threshold;
for unicast or multicast terminals, a synchronization between a transmitting terminal and a receiving terminal in a sidelink failing.

4. The RRC connection management method according to claim 3, wherein the terminal experiencing the RLF on the sidelink interface comprises one of following information:
a physical layer of the terminal indicating, to an RRC layer of the terminal, that a problem occurs in a physical layer link of the sidelink interface;
the quantity of ARQ transmissions of the terminal on the sidelink interface reaching a predetermined maximum transmission quantity.

5. The RRC connection management method according to claim 3, wherein the waiting time comprises one or a sum of at least two of following information:
a waiting time of the data packet of the sidelink service in a packet data convergence protocol (PDCP) layer buffer;
a waiting time of the data packet of the sidelink service in a radio link control (RLC) layer buffer;
a waiting time of the data packet of the sidelink service in a medium access control (MAC) layer buffer.

6. The RRC connection management method according to claim 1, wherein the second information comprises:
that a transmission path for the sidelink service needs to be switched from a sidelink to a Uu link in a cellular network.

7. The RRC connection management method according to claim 1, wherein the third information comprises one of following information:
that a resource allocation mode to be used by a first sidelink service of the terminal is switched from a terminal autonomous selecting resource allocation mode to a network scheduling resource allocation mode;
that a resource allocation mode currently used by the terminal is switched from the terminal autonomous selecting resource allocation mode to the network scheduling resource allocation mode.

8. The RRC connection management method according to claim 1, wherein the fourth information comprises one of following information:
that a current sidelink interface does not support the radio access technology selected by the terminal for the sidelink service;
that for unicast or multicast, radio access technologies supported by a transmitting terminal and a receiving terminal for the sidelink interface do not match each other.

9. The RRC connection management method according to claim 1, wherein, the RRC connection management message is an RRC connection establishment request message in a case that the target RRC state is the RRC_IDLE state;
the RRC connection management message is an RRC connection resume request message in a case that the target RRC state is the RRC_INACTIVE state.

10. The RRC connection management method according to claim 9, wherein,
the RRC connection establishment request message carries a reason for an RRC connection establishment request in a case that the target RRC state is an RRC_IDLE state; or,
the RRC connection resume request message carries a reason for an RRC connection resume request in a case that the target RRC state is an RRC_INACTIVE state.

11. A terminal, comprising a transceiver, a storage, a processor and a program that is stored in the storage and configured to be executed by the processor, wherein the processor is configured to execute the program to implement following step:
transmitting an RRC connection management message to a network device in a case that a predetermined condition is met, when the terminal is in a target RRC state,
wherein the predetermined condition comprises one of following information;
first information about a link quality of a sidelink interface;
second information about a transmission path selection of a sidelink service;
third information about a resource allocation mode corresponding to the sidelink service;
fourth information about a radio access technology (RAT) corresponding to the sidelink service;
wherein the target RRC state is an RRC_IDLE state or an RRC_INACTIVE state.

12. The terminal according to claim 11, wherein the terminal is a terminal having data available on a logic channel corresponding to the sidelink interface.

13. The terminal according to claim 11, wherein the first information comprises one of following information:
the terminal experiencing a radio link failure (RLF) on the sidelink interface;
the terminal experiencing a beam failure on the sidelink interface;
a quantity of hybrid automatic repeat request (HARQ) transmissions of a first process of the terminal on the sidelink interface being greater than or equal to a first threshold;
a quantity of automatic repeat request (ARQ) transmissions of the terminal on the sidelink interface being greater than or equal to a second threshold;
a measurement result of a transmission resource pool of the sidelink interface for the terminal being smaller than a first limit value;
a waiting time of a data packet of the sidelink service of the terminal in a buffer being greater than or equal to a predetermined time threshold;
for unicast or multicast terminals, a synchronization between a transmitting terminal and a receiving terminal in a sidelink failing.

14. The terminal according to claim 13, wherein the terminal experiencing the RLF on the sidelink interface comprises one of following information:
a physical layer of the terminal indicating, to an RRC layer of the terminal, that a problem occurs in a physical layer link of the sidelink interface;

the quantity of ARQ transmissions of the terminal on the sidelink interface reaching a predetermined maximum transmission quantity.

15. The terminal according to claim 13, wherein the waiting time comprises one or a sum of at least two of following information:
   a waiting time of the data packet of the sidelink service in a packet data convergence protocol (PDCP) layer buffer;
   a waiting time of the data packet of the sidelink service in a radio link control (RLC) layer buffer;
   a waiting time of the data packet of the sidelink service in a medium access control (MAC) layer buffer.

16. The terminal according to claim 11, wherein the second information comprises:
   that a transmission path for the sidelink service needs to be switched from a sidelink to a Uu link in a cellular network.

17. The terminal according to claim 11, wherein the third information comprises one of following information:
   that a resource allocation mode to be used by a first sidelink service of the terminal is switched from a terminal autonomous selecting resource allocation mode to a network scheduling resource allocation mode;
   that a resource allocation mode currently used by the terminal is switched from the terminal autonomous selecting resource allocation mode to the network scheduling resource allocation mode,
   or,
   wherein the fourth information comprises one of following information;
   that a current sidelink interface does not support the radio access technology selected by the terminal for the sidelink service;
   that for unicast or multicast, radio access technologies supported by a transmitting terminal and a receiving terminal for the sidelink interface do not match each other.

18. The terminal according to claim 11, wherein,
   the RRC connection management message is an RRC connection establishment request message in a case that the target RRC state is the RRC_IDLE state;
   the RRC connection management message is an RRC connection resume request message in a case that the target RRC state is the RRC_INACTIVE state.

19. The terminal according to claim 18, wherein,
   the RRC connection establishment request message carries a reason for an RRC connection establishment request in a case that the target RRC state is an RRC_IDLE state; or,
   the RRC connection resume request message carries a reason for an RRC connection resume request in a case that the target RRC state is an RRC_INACTIVE state.

20. A non-transitory computer readable storage medium, storing therein a computer program, wherein a processor executes the computer program to implement following steps:
   transmitting, by a terminal in a target RRC state, an RRC connection management message to a network device in a case that a predetermined condition is met,
   wherein the predetermined condition comprises one of following information;
   first information about a link quality of a sidelink interface;
   second information about a transmission path selection of a sidelink service;
   third information about a resource allocation mode corresponding to the sidelink service;
   fourth information about a radio access technology (RAT) corresponding to the sidelink service;
   wherein the target RRC state is an RRC_IDLE state or an RRC_INACTIVE state.

* * * * *